(12) United States Patent
Ah Kun et al.

(10) Patent No.: US 11,080,041 B1
(45) Date of Patent: Aug. 3, 2021

(54) OPERATING SYSTEM MANAGEMENT FOR VIRTUAL WORKSPACES

(71) Applicant: Amazon Technologies, Inc., Reno, NV (US)

(72) Inventors: Malcolm Russell Ah Kun, Kirkland, WA (US); Anshuk Chakraborty, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 62 days.

(21) Appl. No.: 15/474,539

(22) Filed: Mar. 30, 2017

(51) Int. Cl.
  *G06F 8/656* (2018.01)
  *G06F 9/445* (2018.01)
  *G06F 9/455* (2018.01)

(52) U.S. Cl.
  CPC .......... *G06F 8/656* (2018.02); *G06F 9/44505* (2013.01); *G06F 9/45533* (2013.01)

(58) Field of Classification Search
  CPC ... G06F 8/656; G06F 9/44505; G06F 9/45533
  See application file for complete search history.

(56) References Cited

U.S. PATENT DOCUMENTS

| | | | | |
|---|---|---|---|---|
| 8,127,291 B2* | 2/2012 | Pike | ..................... | G06F 9/45558 718/1 |
| 8,458,392 B2* | 6/2013 | Gao | ..................... | G06F 9/45537 711/162 |
| 8,769,519 B2* | 7/2014 | Leitman | .................... | G06F 8/65 717/168 |
| 8,805,951 B1* | 8/2014 | Faibish | ................. | G06F 9/5072 709/213 |
| 8,849,978 B1* | 9/2014 | Batson | ............. | H04W 12/0806 709/223 |
| 8,898,668 B1* | 11/2014 | Costea | ................ | G06F 9/45558 709/203 |
| 9,135,048 B2* | 9/2015 | Klein | .................. | G06F 9/45558 |
| 9,286,092 B1* | 3/2016 | Beda, III | ............ | G06F 9/45533 |
| 9,313,188 B2* | 4/2016 | Hussain | ............. | H04L 63/0272 |
| 9,524,389 B1* | 12/2016 | Roth | .................... | G06F 9/45533 |
| 9,641,406 B1* | 5/2017 | Allen | ........................ | G06F 8/65 |
| 9,641,599 B2* | 5/2017 | Wesley | ................... | H04L 67/10 |
| 9,645,847 B1* | 5/2017 | Roth | ..................... | G06F 9/4868 |
| 9,767,106 B1* | 9/2017 | Duggal | ................... | G06F 11/14 |

(Continued)

*Primary Examiner* — Douglas M Slachta
(74) *Attorney, Agent, or Firm* — Hogan Lovells US LLP

(57) ABSTRACT

Virtual workspaces can be provided using a shared resource environment. A workspace accessed under a customer account can perform an upgrade or downgrade of the operating system by building a new workspace instance instead of modifying an existing workspace instance. A workspace bundle can be obtained that includes a machine image for the target operating system, as well as configuration information and information for default applications installed for the workspace. A new workspace instance can be created using the workspace bundle and user-specific configuration information. A workspace agent can perform a simplified install of the applications using information from the prior workspace. One or more new data volumes can be created using a snapshot from the prior workspace. Once configured, the new workspace instance can be made available to the user. The process can be repeated using the prior workspace bundle if an operating system downgrade is requested.

19 Claims, 6 Drawing Sheets

(56) References Cited

U.S. PATENT DOCUMENTS

| | | | | |
|---|---|---|---|---|
| 9,965,305 | B2* | 5/2018 | Zu | G06F 9/45533 |
| 10,409,625 | B1* | 9/2019 | Suryanarayanan | |
| | | | | G06F 9/45533 |
| 10,742,520 | B2* | 8/2020 | Frost | H04W 4/50 |
| 2006/0184935 | A1* | 8/2006 | Abels | G06F 9/5077 |
| | | | | 718/1 |
| 2006/0184937 | A1* | 8/2006 | Abels | G06F 8/65 |
| | | | | 718/1 |
| 2008/0201479 | A1* | 8/2008 | Husain | G06F 9/445 |
| | | | | 709/227 |
| 2009/0198805 | A1* | 8/2009 | Ben-Shaul | G06F 9/4416 |
| | | | | 709/222 |
| 2009/0249332 | A1* | 10/2009 | Hoehle | G06F 9/45558 |
| | | | | 718/1 |
| 2009/0260007 | A1* | 10/2009 | Beaty | G06F 9/5077 |
| | | | | 718/1 |
| 2010/0235828 | A1* | 9/2010 | Nishimura | G06F 8/63 |
| | | | | 717/174 |
| 2011/0078680 | A1* | 3/2011 | Lagergren | G06F 9/5077 |
| | | | | 718/1 |
| 2011/0214176 | A1* | 9/2011 | Burch | G06F 9/45533 |
| | | | | 726/15 |
| 2011/0265076 | A1* | 10/2011 | Thorat | G06F 9/45533 |
| | | | | 717/172 |
| 2012/0096271 | A1* | 4/2012 | Ramarathinam | G06F 9/45558 |
| | | | | 713/172 |
| 2012/0304168 | A1* | 11/2012 | Raj Seeniraj | G06F 9/452 |
| | | | | 718/1 |
| 2013/0275959 | A1* | 10/2013 | Chen | G06F 8/61 |
| | | | | 717/174 |
| 2013/0282792 | A1* | 10/2013 | Graham | G06F 9/45533 |
| | | | | 709/203 |
| 2014/0033194 | A1* | 1/2014 | Natchadalingam | |
| | | | | G06F 9/45558 |
| | | | | 717/173 |
| 2014/0040874 | A1* | 2/2014 | Wilson | G06F 9/44552 |
| | | | | 717/170 |
| 2014/0096136 | A1* | 4/2014 | Duan | G06F 9/455 |
| | | | | 718/1 |
| 2014/0108649 | A1* | 4/2014 | Barton | G06F 9/4445 |
| | | | | 709/224 |
| 2014/0165164 | A1* | 6/2014 | Pizurica | H04L 67/36 |
| | | | | 726/5 |
| 2014/0279909 | A1* | 9/2014 | Sudarsanam | G06F 16/128 |
| | | | | 707/639 |
| 2014/0344806 | A1* | 11/2014 | Suresh | G06F 9/452 |
| | | | | 718/1 |
| 2014/0373092 | A1* | 12/2014 | Hussain | G06F 9/5072 |
| | | | | 726/3 |
| 2015/0040127 | A1* | 2/2015 | Dippenaar | G06F 9/4856 |
| | | | | 718/1 |
| 2015/0089497 | A1* | 3/2015 | Borzycki | G06F 9/45533 |
| | | | | 718/1 |
| 2015/0127618 | A1* | 5/2015 | Alberti | G06F 17/30088 |
| | | | | 707/678 |
| 2015/0205588 | A1* | 7/2015 | Bates | G06F 9/4552 |
| | | | | 717/145 |
| 2015/0326611 | A1* | 11/2015 | Lee | H04L 12/22 |
| | | | | 726/1 |
| 2015/0355923 | A1* | 12/2015 | Keller | G06F 9/45558 |
| | | | | 718/1 |
| 2015/0358392 | A1* | 12/2015 | Ramalingam | H04L 41/0273 |
| | | | | 709/203 |
| 2016/0095044 | A1* | 3/2016 | Maria | H04W 48/02 |
| | | | | 370/329 |
| 2016/0110213 | A1* | 4/2016 | Chen | G06F 9/45558 |
| | | | | 726/1 |
| 2016/0124665 | A1* | 5/2016 | Jain | H04L 61/2007 |
| | | | | 711/162 |
| 2016/0188356 | A1* | 6/2016 | Ramasamy | G06F 9/452 |
| | | | | 718/1 |
| 2016/0232017 | A1* | 8/2016 | Raundahl Gregersen | |
| | | | | G06F 9/44521 |
| 2018/0225104 | A1* | 8/2018 | Ciano | G06F 8/61 |
| 2018/0295120 | A1* | 10/2018 | Dawson | H04L 9/3226 |

* cited by examiner

OPERATING SYSTEM MANAGEMENT FOR VIRTUAL WORKSPACES

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. In some systems users are able to access private workspaces, or virtual desktops, that are provided using these resources. At various times it can be desirable to change various aspects of these workspaces, such as the operating systems used to execute the workspaces, but conventional upgrade processes are slow and complex and present an additional source of risk or error. Often, being able to stream the contents of a workspace requires the operating system to be in a stable state, which is not the case during an upgrade or downgrade of the operating system.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in conventional approaches to managing workspaces in a network environment. In various embodiments, users can utilize workspaces or other virtual environments to perform a variety of tasks. The workspaces can be provided using shared resources that are allocated as appropriate, as may include virtual machines and block-based storage volumes. A workspace accessed under a customer account can perform an upgrade of the operating system by building a new workspace instance instead of upgrading the operating system on an existing instance. A workspace bundle can be obtained that includes a machine image for the target operating system, as well as configuration information and information for default applications installed on the workspace. A machine image may refer to, for example, information that can be used to build a virtual instance, as may include a template for the root volume for the instance (for example, an operating system, an application server, and applications), launch permissions that control which accounts can use the machine image to launch instances, and a block device mapping that specifies the volumes to attach to the instance when launched, among other such options. A new workspace instance can be created using the workspace bundle and user-specific configuration information. A workspace agent can perform a simplified install of the applications using information from the prior workspace. One or more new data volumes can be created using a snapshot from the prior workspace. Once configured, the new workspace instance can be made available to the user. The process can be repeated using the prior workspace bundle if a subsequent operating system downgrade is requested.

Various other such functions can be used as well within the scope of the various embodiments as would be apparent to one of ordinary skill in the art in light of the teachings and suggestions contained herein.

Figure 1:
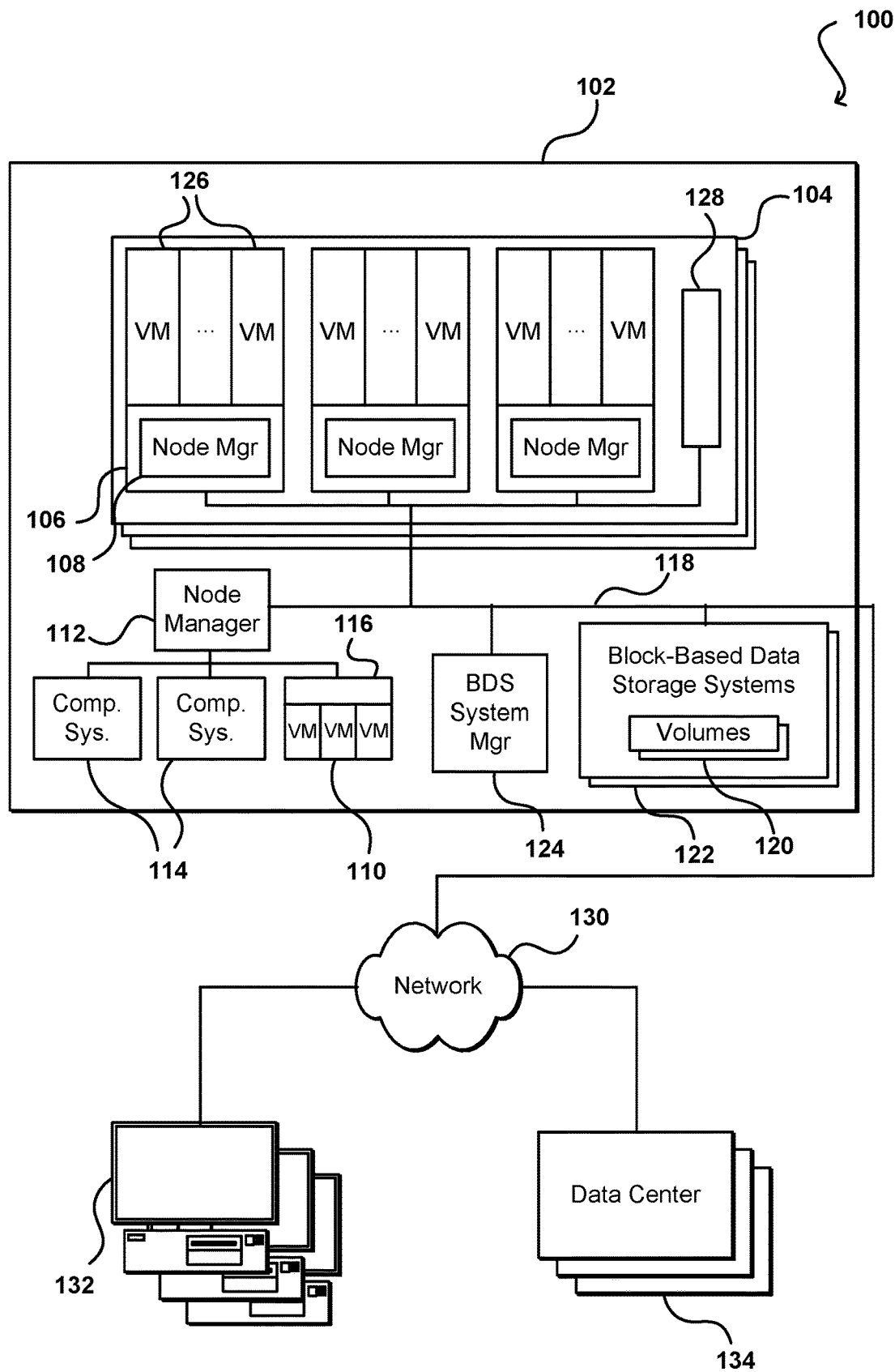
FIG. 1 illustrates an example environment in which aspects of the various embodiments can be implemented.

FIG. 1 illustrates an example network configuration 100 in which computing and data access operations can be performed, along with other such functionality, in accordance with various embodiments. This configuration can include components offered as part of a multi-tenant environment, or resource provider environment 102, wherein the components are provided by a resource provider, and customers pay for access and/or utilization of respective portions of those resources. In this example configuration, the resource provider environment includes a number of racks 104, each rack including a number of host computing devices 106. The host computing systems 106 each host one or more virtual machines. Each virtual machine can act as an independent resource node for executing one or more program copies or performing another such action or process for user data requests, I/O operations, etc. This example configuration also includes computer systems that execute a block-based data storage system or service. The service can utilize a pool of multiple block-based data storage systems, which each have local block-based storage for use in storing one or more volumes 110. Access to the volume copies 110 is provided over an internal network to programs executing on various resource nodes. Thus, an application executing on a virtual machine instance on one of the computer systems 106 can be connected with one or more storage volumes 110 in the block based data storage systems. This is referred to herein as the instance being "attached" to the storage volume(s). In this example configuration, multiple computing systems are operable to execute various programs, applications, and/or services, and further operable to access reliable block-based data storage, such as under the control of a block-based data storage service. A block-based data storage service can use multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 102 includes a number of racks 104, each rack including a number of host computing devices 106, as well as an optional rack support computing system 128 in this example embodiment. The host computing systems 106 on the illustrated rack 104 each host one or more virtual machines 126 in this example, as well as a distinct node manager module 112 associated with the virtual machines on that host computing system to manage those virtual machines. One or more other host computing systems 116 may also each host one or more virtual machines 110 in this example. Each virtual machine 110 may act as an independent resource node for executing one or more program copies or performing another such action or process for user data requests, I/O operations, etc. In addition, this example data center 102 further includes additional host computing systems 114 that do not include distinct virtual machines, but may nonetheless each act as a resource node for one or more tasks being executed for a user. In this example, a node manager module 112 executing on a computing system (not shown) distinct from the host computing systems 114 and 116 is associated with those host computing systems to manage the resource nodes provided by those host computing systems, such as in a manner similar to the node manager modules 108 for the host computing systems 106. The rack support computing system 128 may provide various utility services for other computing systems local to its rack 104 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 102 also includes a computing system 124 that executes a block-based data storage ("BDS") system manager module for the block-based data storage service to assist in managing the availability of non-local block-based data storage to programs executing on resource nodes provided by the host computing systems located within the data center (or optionally on computing systems located in one or more other data centers 134, or other remote computing systems 132 external to the data center). In particular, in this example the data center 102 includes a pool of multiple block-based data storage systems 122, which each have local block-based storage for use in storing one or more volume copies 120. Access to the volume copies 120 is provided over the internal network(s) 118 to programs executing on various resource nodes 110 and 114. As discussed in greater detail elsewhere, a block-based data storage system manager module 124 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS system manager module 122 may coordinate with the node manager modules 112, 108 to manage use of volumes by programs executing on associated resource nodes, while in other embodiments the node manager modules may not be used to manage such volume use. In addition, in other embodiments, one or more BDS system manager modules 124 may be structured in other manners, such as to have multiple instances of the BDS system manager executing in a single data center (e.g., to share the management of non-local block data storage by programs executing on the resource nodes provided by the host computing systems located within the data center), and/or such as to have at least some of the functionality of a BDS system manager module being provided in a distributed manner by software executing on some or all of the server block data storage systems 122 (e.g., in a peer-to-peer manner, without any separate centralized BDS system manager module on a computing system 124).

In this example, the various host computing systems, server block data storage systems, and computing systems are interconnected via one or more internal networks 118 of the data center, which may include various networking devices (e.g., routers, switches, gateways, etc.) that are not shown. In addition, the internal networks 118 are connected to an external network 130 (e.g., the Internet or another public data network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 134 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the block-based storage systems 122 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, then such a data center may execute as many as tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 1 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 1, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device.

When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume may not be able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

As mentioned, resources such as virtual machine instances can be allocated as needed to provide various user functionality. This can include, for example, the providing of virtual computer desktops or other types of virtual workspaces that can be accessed by one or more authorized users having the appropriate credentials to access a given workspace. In conventional approaches, a user is able to manage various aspects of such a workspace, such as to install various applications, store user-specific data, and specify various user configurations or preferences, among other such options. If it is desired to change the operating system for a workspace, the upgrade must not only be configured for the workspace but must also be able to handle these various user customizations. Changing operating systems is a non-trivial process, whether upgrading to a new operating system or downgrading to a prior operating system. Doing such an upgrade in a multi-tenant environment, or on virtual resource instances, can be even more complex as being able to stream the contents of a workspace, for example, requires the operating system to be in a stable state, which will not be the case during an upgrade or downgrade of the operating system.

Accordingly, approaches in accordance with various embodiments can provide for the building of a new workspace with the target operating system, instead of the upgrading or downgrading of the operating system used for a current workspace. In order to provide such functionality, approaches in accordance with various embodiments can treat the workspace configuration as comprising various layers or components which can be altered or replaced without significantly impacting the other layers. For example, a set of workspace configuration metadata, also referred to herein as a workspace bundle, can include components such as a machine image that specifies the operating system, a list of default applications installed for the workspace, as well as hardware configuration information that can refer to the type of computing resource to be used, the type of storage resource, and the like. A set of user configuration or preference data can also be utilized, which can also contain information identifying applications installed by the specific user as discussed elsewhere herein. Using the various components as building blocks, the upgrading (or downgrading) of an operating system for a workspace can involve the building of a new workspace that includes the target operating system while maintaining the other aspects for the workspace, including user-specific applications, data, or configuration. Such an approach can enable a user, such as an enterprise customer to upgrade their workspace(s) to a new version of an operating system, for example, and ensure that the new operating system is still compatible with their enterprise applications. Such an approach also provides for the downgrading of the operating system for the workspace(s) in the event that incompatibilities are found without loss of data, or having to spend hours on the upgrade or downgrade process, which may not ultimately be successful. For example, if the old workspace is still available then the instance can be reverted to the instance with the prior operating system. If not, a new instance can be generated with the prior operating system, which can avoid a complex downgrade process which can be prone to errors.

In some embodiments, a workspace management service can enable this feature in part by allowing for some flexibility in the machine images used to generate the instances. For example, a machine image can be allowed to include some amount of metadata that can be associated with a workspace bundle. The image for a bundle can then be updated with any appropriate but related operating system, such as Windows 2008/2016 or Windows 7/10, rather than only the exact same version of the operating system as is required by conventional systems. Such an approach would allow for the moving between images with related operating systems in any direction. Once a new image is associated with a given workspace bundle, a workspace manager can provide a rebuild feature that can construct a new workspace based on the current bundle definition associated with the workspace when the workspace was originally built. The current bundle definition in this embodiment will differ only by the image with the different operating system. During a rebuild, a snapshot of the user configuration and/or data volume can be restored to a new volume as part of the workspace reconstruction. Metadata associated with the applications that were configured to be installed on the workspace can be associated with the newly constructed workspace, and the applications can be added to the newly constructed workspace when the agent managing application installation on the workspace detects that they are not on the newly constructed workspace.

Figure 2:
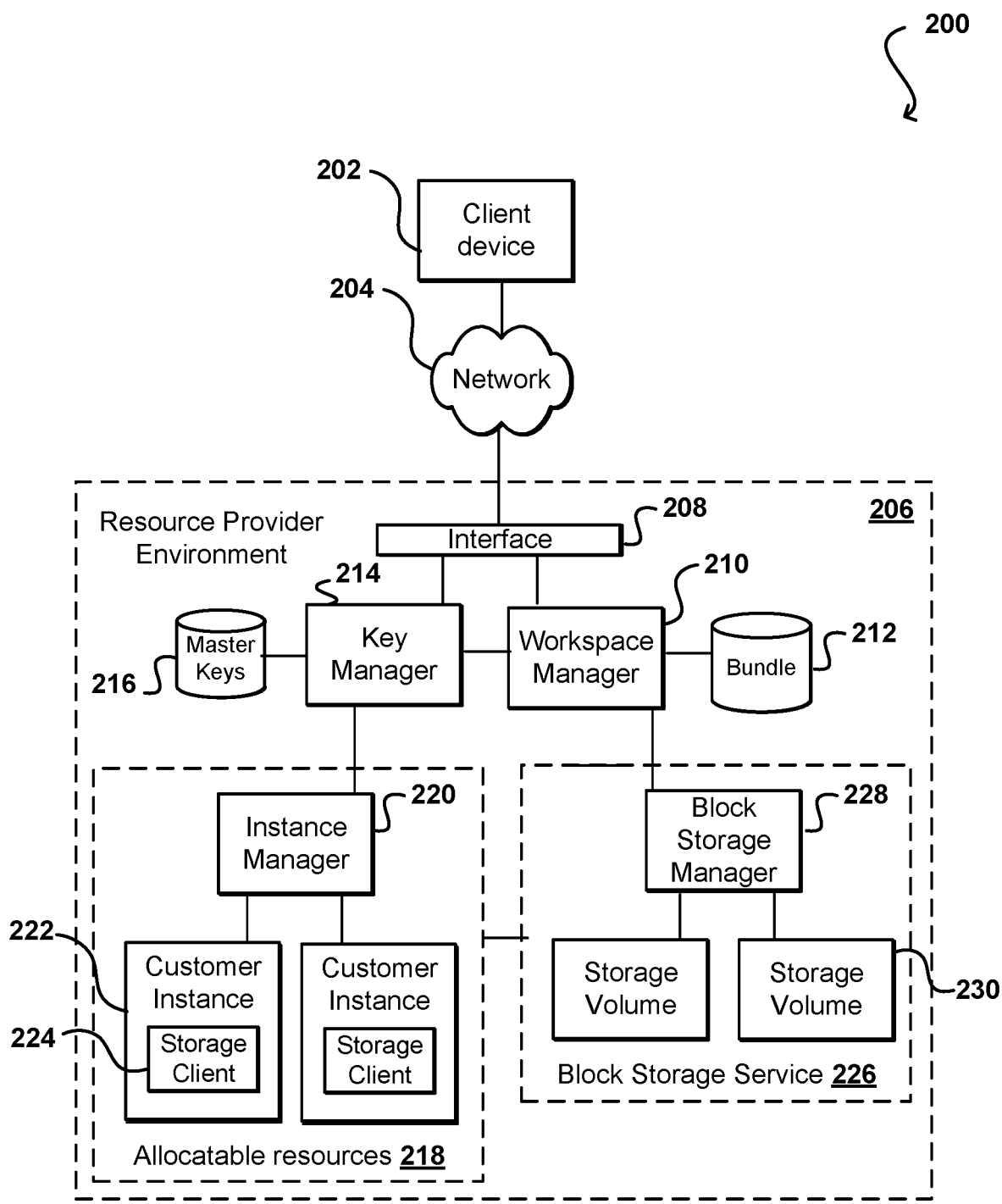
FIG. 2 illustrates components of an example workspace management service that can be utilized in accordance with various embodiments.

FIG. 2 illustrates an example workspace environment 200 that can be implemented in accordance with various embodiments. In this example, a user wanting to access a workspace can utilize a client device 202 to submit a request (via a console or API) over at least one network 204 to be received to an interface layer 208 of a resource provider environment 206, service provider environment, or other shared-resource or multi-tenant environment as discussed herein. Information for the request can be directed to a workspace manager 210 which can manage workspaces for various customers having accounts with the resource provider. The workspace manager can work with an instance manager 220, or resource manager or node manager as discussed elsewhere herein, to cause a customer instance 222, such as a virtual machine instance, to be allocated to support the workspace. The workspace manager 210 in this example can also work, directly or indirectly, with a block storage manager 228 of a block storage service 226 to allocate a storage volume 230 to be used to store data for the allocated workspace. A storage client 224 executing as part of the workspace on the customer instance 222 can cause data to be transmitted between the customer instance 222 and the corresponding storage volume 230. Although a block storage service 226 is discussed in this example, it should be understood that various other types of storage can be utilized as well within the scope of the various embodiments.

In various embodiments the data storage volume 230, and data transmitted between the storage client 224 and storage volume 230, can be encrypted by default as part of the workspace service. In other embodiments a customer or other entity may select whether or not to perform such encryption. As mentioned, the encryption can be performed independent of, or without knowledge on the part of, the underlying operating system for the customer instance 222. Upon setting up a workspace account or service for a specific customer, a key manager 214 or other key management service can generate a master key specific to that customer, that can be stored to a master key data store 216 or other such location. In this example the customer master key is not typically exported or available outside the key management service. The master key will be maintained by the key manager 214 and used to generate individual data encryption keys to be used with the various workspaces.

In the example of FIG. 2, a workspace instance is generated by having the workspace manager 210 contact an instance manager 220 for the allocatable resources 218 to have a customer instance allocated. The workspace manager 210 can provide a workspace bundle, or other set of workspace configuration metadata, stored in a bundle repository 212 or other such location. A workspace bundle can include the information about the machine image, user applications, and other aspects needed to build the workspace. The instance manager can determine, or initialize, a virtual machine instance having the appropriate characteristics and capacity, and can cause a corresponding storage volume 230 to be generated using the information from the machine image. Since the workspace manager 210 will have access to the existing data encryption key, the block storage manager can leverage the access under that key to also grant access so the block storage service 226 can decrypt and encrypt the data online. The storage client 224 for the workspace will not store a copy of the key, but can store one or more access criteria or credentials such that the storage client 224 can call into the key manager 214 to obtain the relevant key(s).

It might be the case that a user, customer, or other authorized entity will want to upgrade the operating system used for one or more workspaces. In some embodiments, the user can submit a request using a console accessible through the client device 202 or an API exposed through the interface layer 208 that can be directed to a workspace manager 210. It should be understood that there can be a single workspace manager, or there can be a workspace management service that includes workspace application managers and other such components in accordance with the various embodiments. In this example, information for an operating system upgrade (or downgrade) for a workspace can be received to the workspace manager, which can then determine whether an appropriate workspace bundle exists in the bundle repository 212. If the appropriate bundle does not exist, the workspace manager can obtain, modify, or generate a machine image including information for the target operating system, and can pull the other information from an existing bundle for the workspace to generate the new workspace bundle. Other approaches for obtaining the new bundle can be utilized as well within the scope of the various embodiments. The workspace manager 210 can cause the existing or prior workspace bundle to be stored as well, at least for a minimum period of time, to provide for a rollback or downgrade of the operating system for the workspace.

Once an appropriate workspace bundle has been obtained that includes an image for the target operating system, the workspace can be "rebuilt" using the corresponding bundle. The rebuilding, as utilized in at least this embodiment, refers to the generation of a new workspace on a new instance with the target operating system that can then be utilized in place of the existing workspace with the current operating system. The old instance can then be destroyed, or maintained for at least a sufficient amount of time for the new instance to be verified and made available for use by the user, in case a quick rollback is requested. The generation of the instance can be similar to the generation of the initial instance, except that the image used for the instance will be different and some configuration adjustments may be needed to cause the user to access the new workspace instead of the previously utilized workspace. The existing metadata and configuration data from the bundle can be utilized which allows the same configuration, such as installed applications and desktop backgrounds, etc., to be ported to the new workspace. The workspace is essentially the same except for the underlying operating system layer. Such an approach avoids the lengthy and complicated process of upgrading an operating system for a machine instance, including updating drivers, configuration information, and the like. A clean installation can also be less likely to exhibit errors than an upgrade, particularly for user desktops and other virtual workspaces operated in a cloud environment.

Figure 3A:
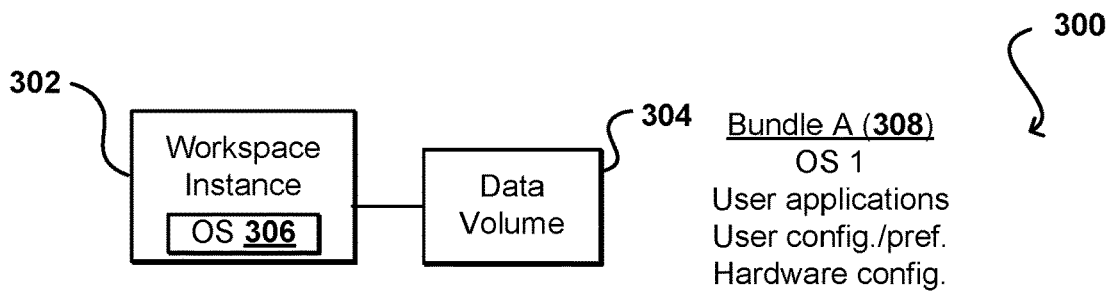
FIGS. 3A, 3B, and 3C illustrate an example process for building a new workspace with a different operating system that can be utilized in accordance with various embodiments.
Figure 3B:
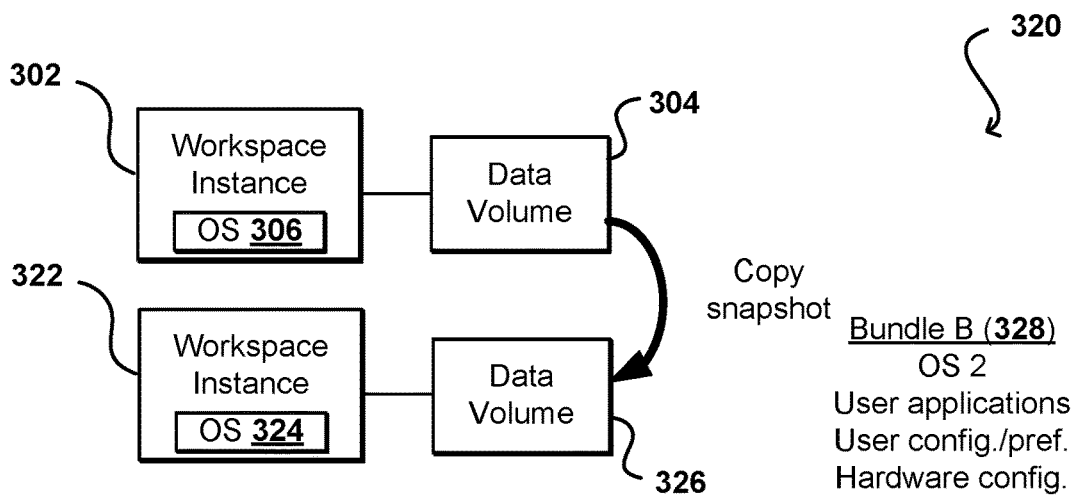
Figure 3C:
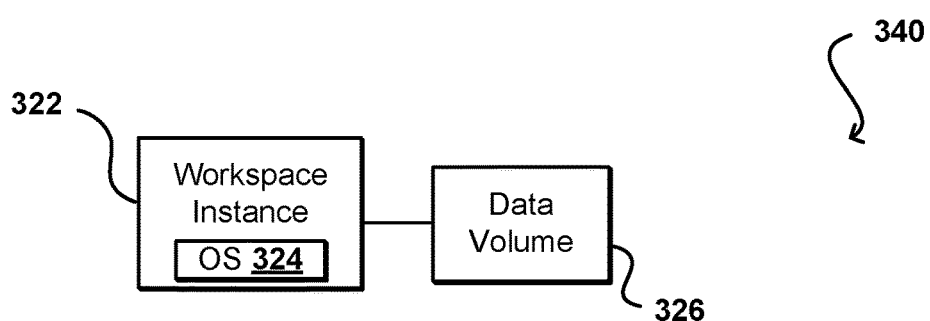

FIGS. 3A, 3B, and 3C illustrate stages of an example workspace rebuild workflow that can be utilized in accordance with various embodiments. In the example stage 300 illustrated in FIG. 3A, a workspace instance 302 is launched that is associated with a data volume 304. The workspace instance 302 can be built using a corresponding workspace bundle 308, or set of metadata indicating configuration information for the workspace. As illustrated, the bundle can be comprised of various layers or components, as may correspond to the operating system to be utilized, the user applications to be installed, user configuration and/or preference information, and hardware configuration for the instance and/or data volume. Various other layers or components can be utilized as well within the scope of the various embodiments. The data volume 304 can be generated using a snapshot, such as a snapshot of data for a prior workspace instance or a snapshot for a default customer instance, among other such options. A snapshot may refer to, for example, a copy of the storage used as the hard drive for the workspace, or another data set representative of the state of the data for a workspace at a point in time. The metadata for the instances can include a link, or other pointer or locator, to the snapshot to be used for the workspace. In at least one embodiment, the snapshot will be encrypted under a data encryption key that was generated using a customer master key on the account. The workspace instance 302 can then execute the various customer applications for the workspace using the installed operating system 306 indicated by the workspace bundle 308.

A request or instruction may be received, such as to a workspace manager, to upgrade (or downgrade) the operating system. As mentioned, this can be received through a console or workspace API, among other such options. Further, the request can be initiated by a user or customer, or by a resource administrator or other such authorized entity. Information for the request can be directed to a workspace manager, which can perform tasks needed for the upgrade. In this example, this can include identifying the appropriate workspace bundle for the upgrade, which can include various components for the current workspace 302 with the current operating system 306, as well as a machine image corresponding to the target operating system, as illustrated in the example stage 320 of FIG. 3B. As mentioned, if the machine image does not exist then it must be obtained or created as appropriate. As part of the upgrade process, a snapshot can be captured of the current data volume 304 (e.g., the root volume) for the current workspace. This snapshot may include current customer data, configuration data, and the like. As mentioned, the workspace instance 302 can be paused before capture of the snapshot such that no data is processed by the workspace instance after the snapshot that would then not be replicated to the new data volume 326. Alternatively, new data may be allowed to be received by the workspace instance, but it may be held in a buffer to be written to the new data volume 326 at a later time or written to the new data volume 326 immediately if it is already available. A new data volume 326 can be generated as part of the upgrade process, and as part of the process a new data encryption key may be generated using the master key for the customer. The data key can be unique to this particular workspace. Such a copy process can involve decrypting the original snapshot using the prior data encryption key and then encrypting the new snapshot using the new data encryption key. A new data volume 326 can then be created that can store data for the new workspace instance 324.

In parallel in at least some embodiments, the new workspace instance 322 can be created or allocated using information from the appropriate workspace bundle and user information. This can include, for example, launching or obtaining an instance with the target operating system 324 and configuring the instance using the user configuration and preference data. A workspace application manager, or other such component or service, can cause the appropriate applications to be installed and configured, and any user data or workspace-specific information can be installed or stored in memory for the instance as well. Once configured per the bundle, the new workspace instance 322 should appear from a user perspective to function virtually the same as the prior workspace instance, except that the new instance 322 will operate on the target operating system 324 and will reflect any changes resulting therefrom. As illustrated in a final stage 340 of FIG. 3C, once the new workspace instance 322 and data volume 326 are created and available, a user corresponding to the workspace can be enabled to access and utilize the new workspace instance 322, and the prior workspace instance 302 and data volume can be destroyed, or at least wiped of workspace data and configuration and made available for allocation to other users for other workspaces or uses. As mentioned, in some embodiments the prior workspace and data volume may be retained for at least a determined amount of time to ensure that the new workspace instance and data volume are functioning properly, such that a quick revert is available if necessary or desired. After that time, a similar operating system change operation can be performed, which can perform similar steps but utilizing a workspace bundle for the prior operating system 306 such that the workspace can be restored to its prior state.

In some embodiments a user workspace can consist of two data volumes: a root volume that contains the operating system and related information, and a second data volume that contains, for example, the user profile information, application related information, preference or configuration data, or other user-specific information. In some embodiments, the root volume for a new workspace can change but the user profile volume will be essentially unchanged, such that all user profile information will be retained for the new workspace. In some embodiments, a workspace agent on the instance can be responsible for determining, based on the information from the workspace bundle, the applications to be installed or associated with the workspace, and can update the pointers or access to the user profile volume accordingly. As mentioned elsewhere herein, the applications for a workspace are managed in a way that enables the applications to be treated as virtualized applications, such that the applications for a new workspace do not need to be installed from scratch, in at least some embodiments. The workspace manager can maintain the bits associated with an application installation such that the manager has access to all registry settings and other information to cause the application to appear to be installed but virtualized in type of container for the workspace. Thus, a full reinstallation is not required. Drivers and other information and components installed on the workspace can be ported over during the creation of the new instance and installing of the applications by the application manager.

In some embodiments, data transmitted between the workspace instance and the network-attached storage volume will pass through a storage client of the instance to be encrypted using the workspace-specific key. Data received to the instance can then be decrypted by the storage client using the workspace-specific key and passed to the operating system (or other appropriate destination). The encryption on each read and write can be performed at the block level in at least one embodiment. At least some amount of caching may be utilized such that a separate encryption and transmission is not performed for each individual read or write operation. Operations within the workspace instance can be performed on the raw or unencrypted data. While discussed with respect to workspaces, it should be understood that encryption approaches discussed and suggested herein can be utilized with other applications and virtual environments as well within the scope of the various embodiments.

In at least some embodiments, workspaces can be shut down at the end of a customer session. Workspaces may also be shut down automatically after a period of inactivity or another such termination criterion. Termination in at least some embodiments can involve capturing a snapshot of the current state of the data, encrypting that snapshot under the current data encryption key, storing the snapshot to a determined location, then destroying the virtual machine instance and data volume, or at least scrubbing the instance and volume and making them available for use by other users, customers, or other such entities. When the workspace needs to be accessed again, such as upon a subsequent request from a valid user, a process such as those discussed herein can be utilized to allocate a new instance and attach a data storage volume encrypted under a volume-specific key.

Figure 4:
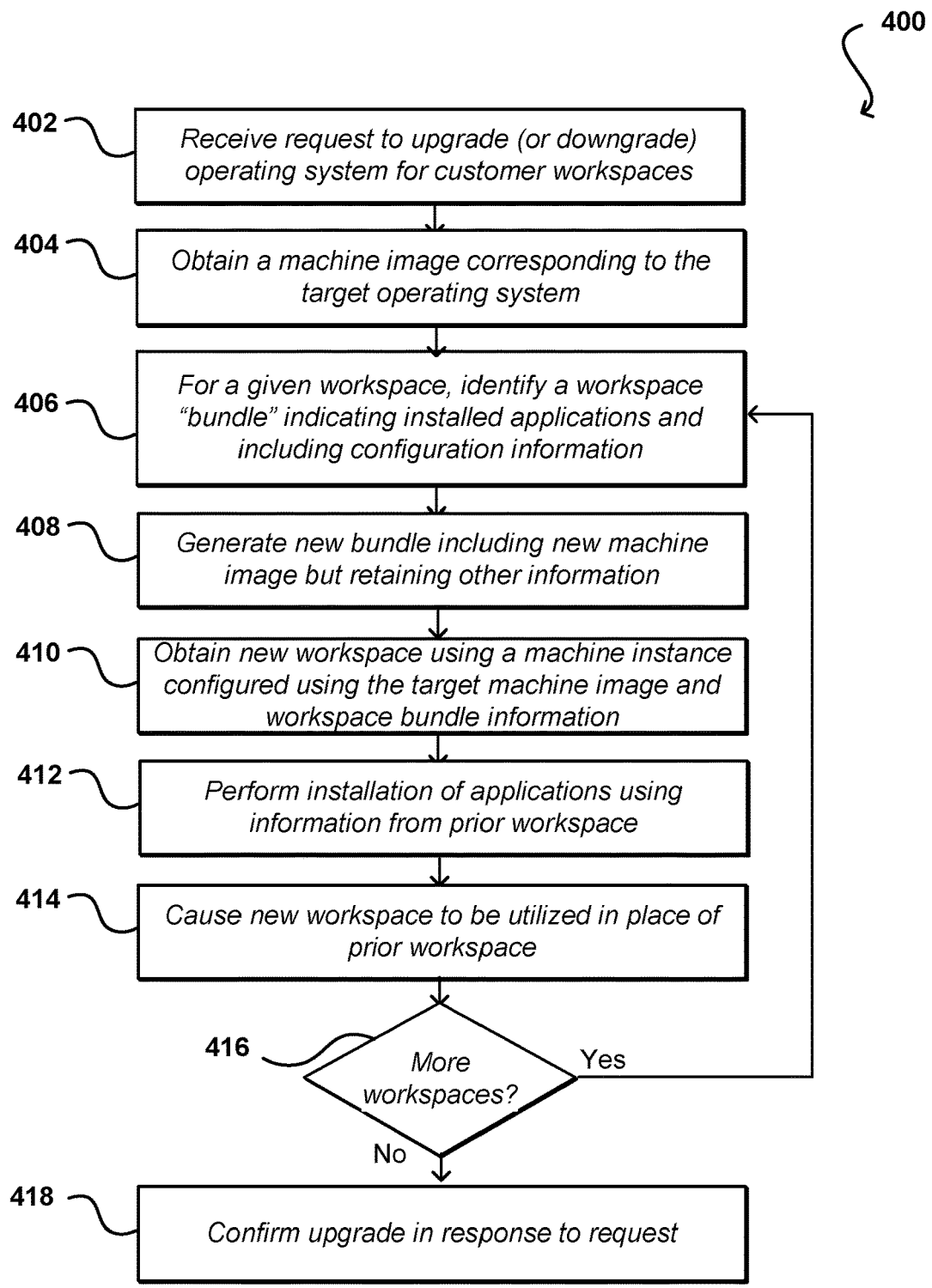
FIG. 4 illustrates an example process for managing workspace instances that can be utilized in accordance with various embodiments.

FIG. 4 illustrates an example process 400 for managing workspace instances that can be utilized in accordance with various embodiments. It should be understood for the various processes described herein that additional, fewer, or alternative steps can be performed in similar or alternative orders, or in parallel, within the scope of the various embodiments unless otherwise stated. In this example, a request is received 402 to upgrade (or downgrade) an operating system for one or more customer workspaces. These can include user-specific workspaces allocated under an account of a customer with a resource provider, among other such options. Each workspace can be provided by a virtual machine instance, for example, executing workspace applications on an operating system installed on the various instances. The change in workspace might be to upgrade to a new version, or downgrade to a prior version, as discussed elsewhere herein. Further, the request can be initiated by the customer, an administrator associated with the resource provider environment, or another authorized entity.

A machine image can be obtained 404, either identified or generated, that corresponds to the target operating system to be utilized after the upgrade/downgrade, and is corresponds to the type of machine instance to be utilized for the workspaces. As discussed elsewhere herein, a machine image can comprise a read-only file system image that includes an operating system, such as an identified version of Linux, Unix, or Windows, as well as additional software required by the operating system. An example machine image can include an XML manifest file storing information such as the name, version, architecture, kernel identifier, decryption key, and digests, among other such options. The machine image can be used for each workspace to be upgraded in response to the customer request. While a customer might utilize workspaces with different operating systems, requests or instructions to upgrade from one specific OS to another specific OS will generally be done individually to avoid confusion.

Although the virtual workspaces for a customer will generally use the same operating system and core applications, each user will have the ability to perform at least some amount of customization. For example, a user can install various applications, set user preferences, store user-specific data, etc. Thus, the upgrade in at least some embodiments will involve workspace-specific tasks for each workspace. In this example, the upgrade will not involve a conventional upgrade of the operating system for a machine instance for a workspace, but will instead involve the building of a new workspace with the target operating system. This new workspace, however, will need to retain the look, feel, and functionality of the existing workspace, at least to the extent possible and/or practical. Accordingly, for each workspace an existing bundle can be identified 406 that includes metadata indicating information for the workspace. As discussed elsewhere herein, the metadata can specify information such as the appropriate workspace image to build the workspace, installation information for applications for the workspace, and hardware and software configuration information for the workspace, among other such options. In order to build a new workspace, a new bundle can be generated 408 that identifies the new machine image corresponding to the target operating system, and includes the other relevant information from the existing workspace bundle. A new workspace can then be obtained 410 (i.e., generated or by pointing to a new bundle, etc.) using the identified machine image for the target OS, with the machine instance being configured using the configuration information contained in, or specified by, the bundle. A simplified installation of the workspace applications can also be performed 412 according to the bundle information. As mentioned elsewhere herein, the applications for the workspace are treated as virtualized applications with various information, such as the drivers, registry keys, and configuration information already determined, such that installation of an application can leverage this information to perform a shortened and/or simplified installation. Once the applications are installed and any user preferences set, the new workspace can be enabled to be utilized 414 in place of the prior workspace. From a user point of view, the workspace should look and function identical to the prior workspace except for differences due to the change in operating system. The prior workspace can then be deleted or otherwise enabled to be allocated for other users or uses. Alternatively, the prior workspace may be maintained for a period of time to enable more efficient rollback to the prior workspace or operating system. If there are more workspaces 416, then the process can continue, although in at least some embodiments the upgrading of workspaces can be done concurrently or in parallel. Once completed, the upgrade can be confirmed 418, such as by sending a message or updating a status, among other such options.

Figure 5:
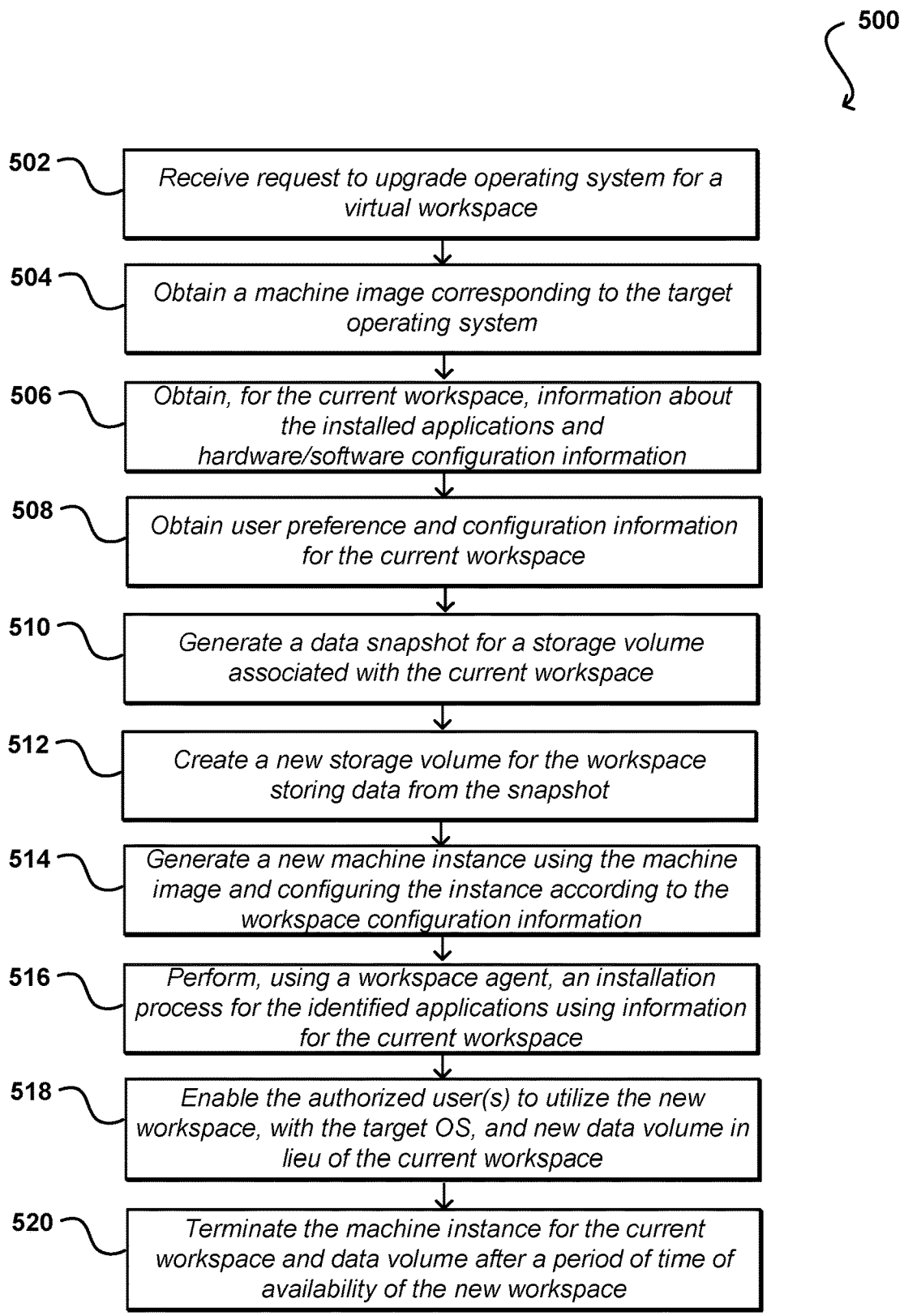
FIG. 5 illustrates an example process for building a workspace instance that can be utilized in accordance with various embodiments.

FIG. 5 illustrates another example process 500 for upgrading (or downgrading) the operating system for a virtual workspace that can be utilized in accordance with various embodiments. In this example, a request is received 502 to upgrade (or downgrade) an operating system for a virtual workspace. Instead of a conventional operating system upgrade, however, a determination can be made to create a new workspace with the target operating system. In some embodiments an evaluation may be performed as to the amount of time or effort saved by the creation of a new workspace, as an upgrade to an entire new version of an OS might benefit from the generation of a new workspace but a minor upgrade that includes specific fixes or minor changes might be adequately implemented using a conventional upgrade process, among other such options. In this example, a machine image is obtained 504 that corresponds to the target operating system. In addition, information for the current workspace can be obtained 506, as may relate to default applications installed on the current workspace and hardware/software configuration for the workspace, etc. User preference and/or configuration information can also be obtained 508, as may correspond to a user profile stored for the existing volume. The user information can also identify other applications that the specific user may have installed to the workspace as discussed elsewhere herein.

In this example, a new data volume will also be created 512 along with a new machine instance. Accordingly, the current machine instance can be paused in some embodiments and a data snapshot generated or captured for the existing data volume(s) for the workspace. The pausing of the instance prevents new data from being captured or modified after the snapshot is captured, which then may not be replicated to the new volume unless a synchronization process is performed, etc. Alternatively, new data may be allowed to be received by the workspace instance, but it may be held in a buffer to be written to the new volume at a later time or written to the new volume immediately if it is already available. At least one new storage volume can be created 512 using the snapshot(s), and a new machine instance generated 514 using the new machine image and the configuration information from the current workspace. Once the new machine instance is executing, a workspace agent can perform 516 an installation process, which may be shortened, for at least some of the identified default applications for the workspace as discussed elsewhere herein, which can leverage known information and obtained elements to simplify and shorten the installation process. The user-specific applications can be installed as well, but which may not allow for a shortened installation process in at least some embodiments. Once the applications are installed and the user preferences set per the workspace information, along with any other workplace settings or information discussed elsewhere herein, the authorized user(s) for the workspace can be enabled 518 to utilize the new workspace with the target OS and new data volume, in lieu of the prior workspace. The machine instance and data volume for the prior workspace can then be terminated 520 after at least a minimum period of availability or verification of the new workspace.

Figure 6:
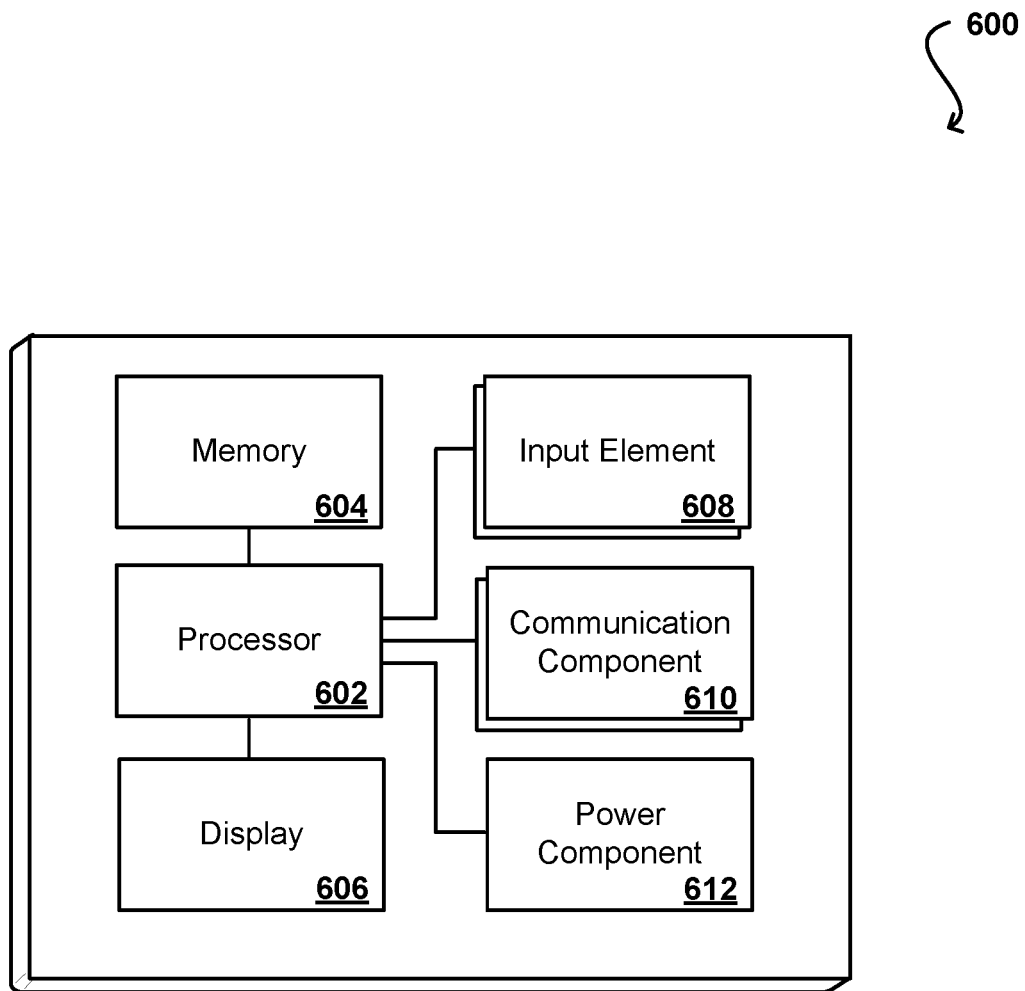
FIG. 6 illustrates components of an example computing device that can be used to perform aspects of the various embodiments.

FIG. 6 illustrates a logical arrangement of a set of general components of an example computing device that can be used to implement aspects of the various embodiments. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device may include some type of display element 606, such as a touch screen or liquid crystal display (LCD), although devices such as portable media players might convey information via other means, such as through audio speakers. In some embodiments, the computing device 600 can include one or more networking and/or communication elements 608, such as a Wi-Fi, Bluetooth, RF, wired, or wireless communication system. The device in many embodiments can communicate with a network, such as the Internet, and may be able to communicate with other such devices. In some embodiments the device can include at least one additional input component 610 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 612, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving a request to upgrade an operating system for a current virtual workspace, the current virtual workspace executing on a virtual machine instance of a multi-tenant environment, the current virtual workspace being remotely accessible through a cloud environment associated with the multi-tenant environment;
    obtaining a machine image corresponding to an upgraded version of the operating system and default applications for the virtual machine instance;
    obtaining workspace-specific information for the current virtual workspace, the workspace-specific information relating to user-installed applications, hardware and software configuration information, and user preference data;
    generating a new virtual workspace using an allocated virtual machine instance of the multi-tenant environment, the new virtual workspace executing the upgraded version of the operating system according to the machine image, the new virtual workspace being further configured using the hardware and software configuration information and the user preference data;
    installing, to the new virtual workspace, at least one application of the user-installed applications or the default applications for the new virtual workspace using the workspace-specific information, wherein the workspace-specific information comprises information maintained from a prior installation in the multi-tenant environment;
    analyzing, for compatibility of the at least one application in the new virtual workspace, the information maintained from the prior installation, the information maintained including at least one of an application driver, a registry key, or a workspace-specific configuration;
    causing the new virtual workspace to be available for access;
    identifying access to the new virtual workspace by an authorized user; and
    terminating the current virtual workspace after one of verifying that the upgraded version of the operating system is compatible with the workspace-specific information or the information maintained from the prior installation or determining a period of time has elapsed since availability of access to the new virtual workspace.

2. The computer-implemented method of claim 1, further comprising:
    generating a data snapshot representing a state of workspace data stored to a data volume for the workspace instance;
    generating a new data volume using the data snapshot; and
    causing the new virtual workspace to utilize the new data volume.

3. The computer-implemented method of claim 1, further comprising:
    applying the information maintained from the prior installation for the at least one application in the new virtual workspace.

4. The computer-implemented method of claim 1, further comprising:
    identifying a current workspace bundle for the current virtual workspace, the current workspace bundle including metadata indicating a current machine image and the workspace-specific information; and
    generating a new workspace bundle for use in generating at least the new virtual workspace by replacing the current machine image, in the current workspace bundle, with the machine image corresponding to the upgraded version of the operating system, the new workspace bundle being utilized to generate additional virtual workspaces for other users.

5. A computer-implemented method, comprising:
    receiving a request to modify a version of an operating system for a current virtual workspace executing in a shared resource environment, the current virtual workspace being remotely accessible through a cloud environment associated with the multi-tenant environment;
    determining workspace-specific information for the current virtual workspace, the workspace-specific information including hardware and software configuration information for the current virtual workspace, the workspace-specific information further including installation information for at least one subset of applications installed to the current virtual workspace;
    generating a new virtual workspace executing the modified version of the operating system and configured using the workspace-specific information;
    causing the at least one subset of the applications to be installed to the new virtual workspace using the installation information, wherein the installation information comprises information maintained from a prior installation in the shared resource environment;
    analyzing, for compatibility of the at least one subset of the applications in the new virtual workspace, the information maintained from the prior installation, the information maintained including at least one of an application driver, a registry key, or a workspace-specific configuration;
    causing a user of the current virtual workspace to instead utilize the new virtual workspace; and
    terminating the current virtual workspace after one of verifying that the upgraded version of the operating system is compatible with the workspace-specific information or the information maintained from the prior installation or determining a period of time has elapsed since availability of access to the new virtual workspace.

6. The computer-implemented method of claim 5, further comprising:
obtaining a new machine image for the new virtual workspace, the new machine image containing the information from a prior machine image used to generate the current virtual workspace and including additional information for the updated version of the operating system; and
generating the new virtual workspace based at least in part upon the new machine image.

7. The computer-implemented method of claim 6, wherein the prior machine image is specific to a default machine image for workspaces associated with a customer account of the shared resource environment.

8. The computer-implemented method of claim 5, further comprising:
allocating a first virtual machine, of the shared resource environment, to execute the current virtual workspace; and
allocating a second virtual machine, of the shared resource environment, to execute the new virtual workspace, the first virtual machine and second virtual machine having configurations determined according to the workspace-specific information.

9. The computer-implemented method of claim 5, further comprising:
determining user profile information for the virtual workspace, the user profile information including user configuration information and user preference information for the current virtual workspace, and identifying user-installed applications; and
causing the new virtual workspace to be modified according to the user profile information before causing the user of the virtual workspace to utilize the new virtual workspace.

10. The computer-implemented method of claim 5, further comprising:
identifying a current workspace bundle for the current virtual workspace, the current workspace bundle including metadata indicating a current machine image and the workspace-specific information; and
generating a new workspace bundle for use in generating at least the new virtual workspace by replacing the current machine image with a machine image associated with the updated version of the operating system, the new workspace bundle being utilized to generate additional virtual workspaces for other users.

11. The computer-implemented method of claim 5, further comprising:
obtaining a data snapshot representing a state of workspace data stored to a data volume for the current virtual workspace;
generating a new data volume using the data snapshot; and
causing the new virtual workspace to utilize the new data volume.

12. The computer-implemented method of claim 11, wherein the new data volume is one of a root volume for the operating system or a profile volume for user profile data.

13. The computer-implemented method of claim 5, wherein the modified version of the operating system is one of an upgrade or a downgrade.

14. The computer-implemented method of claim 5, further comprising:
receiving the request through a management console or a workspace application programming interface (API) of the shared environment.

15. A system, comprising:
at least one processor; and
memory including instructions that, when executed by the at least one processor, cause the system to:
receive a request to modify a version of an operating system for a current virtual workspace executing in a shared resource environment, the current virtual workspace being remotely accessible through a cloud environment associated with the shared resource environment;
determine workspace-specific information for the current virtual workspace, the workspace-specific information including hardware and software configuration information for the current virtual workspace, the workspace-specific information further including installation information for at least one subset of applications installed to the current virtual workspace;
generate a new virtual workspace executing the modified version of the operating system and configured using the workspace-specific information;
cause the at least one subset of the applications to be installed to the new virtual workspace using the installation information, wherein the installation information comprises information maintained from a prior installation in the shared resource environment;
analyze, for compatibility of the at least one subset of the applications in the new virtual workspace, the information maintained from the prior installation, the information maintained including at least one of an application driver, a registry key, or a workspace-specific configuration;
cause a user of the current virtual workspace to instead utilize the new virtual workspace; and
terminate the current virtual workspace after one of verifying that the upgraded version of the operating system is compatible with the workspace-specific information or the information maintained from the prior installation or determining a period of time has elapsed since availability of access to the new virtual workspace.

16. The system of claim 15, wherein the instructions when executed further cause the system to:
obtain a new machine image for the new virtual workspace, the new machine image containing the information from a prior machine image used to generate the current virtual workspace and including additional information for the updated version of the operating system; and
generate the new virtual workspace based at least in part upon the new machine image.

17. The system of claim 15, wherein the instructions when executed further cause the system to:
determine user profile information for the virtual workspace, the user profile information including user configuration information and user preference information for the current virtual workspace, and identifying user-installed applications; and cause the new virtual workspace to be modified according to the user profile information before causing the user of the virtual workspace to utilize the new virtual workspace.

18. The system of claim 15, wherein the instructions when executed further cause the system to:
   identify a current workspace bundle for the current virtual workspace, the current workspace bundle including metadata indicating a current machine image and the workspace-specific information; and
   generate a new workspace bundle for use in generating at least the new virtual workspace by replacing the current machine image with a machine image corresponding to the updated version of the operating system, the new workspace bundle capable of being utilized to generate additional virtual workspaces for other users.

19. The system of claim 15, wherein the instructions when executed further cause the system to:
   obtain a data snapshot representing a state of workspace data stored to a data volume for the current virtual workspace;
   generate a new data volume using the data snapshot; and
   cause the new virtual workspace to utilize the new data volume.

* * * * *